US006328370B1

(12) United States Patent
Kim

(10) Patent No.: US 6,328,370 B1
(45) Date of Patent: Dec. 11, 2001

(54) HORIZONTALLY AND VERTICALLY POSITIONABLE SUN VISOR

(76) Inventor: Sang R. Kim, 11658 Swinton Ave., Granada Hills, CA (US) 91344

( * ) Notice: Subject to any disclaimer, the term of this patent is extended or adjusted under 35 U.S.C. 154(b) by 0 days.

(21) Appl. No.: 09/649,925

(22) Filed: Aug. 29, 2000

(51) Int. Cl.[7] .................................................. B60J 3/00
(52) U.S. Cl. .................... 296/97.11; 296/97.9; 296/97.4
(58) Field of Search ............................ 296/97.11, 97.9, 296/97.4; 29/91.6

(56) References Cited

U.S. PATENT DOCUMENTS

| | | | | |
|---|---|---|---|---|
| 4,130,317 | * | 12/1978 | Lai ...................................... | 296/97.11 |
| 4,202,396 | * | 5/1980 | Levy ................................... | 296/97.11 |
| 4,369,996 | * | 1/1983 | Fluck .................................. | 296/97.11 |
| 4,477,116 | * | 10/1984 | Viertel et al. ......................... | 296/97.1 |
| 4,690,450 | * | 9/1987 | Boerema et al. .................... | 296/97.11 |
| 4,874,938 | * | 10/1989 | Chuang ................................ | 250/203 |
| 5,056,854 | * | 10/1991 | Risen .................................. | 296/97.11 |
| 5,190,339 | * | 3/1993 | Ceideberg ............................ | 296/97.9 |
| 5,328,227 | * | 7/1994 | Pax, Jr. et al. ...................... | 296/97.8 |
| 5,380,057 | * | 1/1995 | Wevers ................................ | 296/97.11 |
| 5,484,183 | * | 1/1996 | Rosa .................................... | 296/97.11 |
| 5,538,310 | * | 7/1996 | Frankhouse et al. ............... | 296/97.11 |
| 5,851,046 | * | 12/1998 | Kalkman et al. .................. | 296/97.11 |
| 5,855,405 | * | 1/1999 | Robles ................................. | 296/97.4 |
| 5,967,587 | * | 10/1999 | Collet et al. ........................ | 296/97.11 |
| 6,007,135 | * | 12/1999 | Alves ................................... | 296/97.11 |

FOREIGN PATENT DOCUMENTS

| | | | |
|---|---|---|---|
| 3942937 | * | 6/1991 | (DE) . |
| 2088299 | * | 9/1981 | (GB) . |
| 2090570 | * | 1/1982 | (GB) . |

* cited by examiner

Primary Examiner—Joseph D. Pape
Assistant Examiner—Kiran B. Patel
(74) Attorney, Agent, or Firm—Albert O. Cota

(57) ABSTRACT

A vehicle sun visor assembly (10) that is designed to be installed by an original equipment manufacturer or after it has been purchased. The assembly (10) consists of a sun visor rod (12) that extends from a position above and near the center of a windshield, curves around the vehicle and terminates near the end of a vehicle side window. The rod (12) is attached to the vehicle by means of a rod/vehicle attachment assembly (32) which allows the rod to be horizontally and vertically positioned to accommodate the dimensions of a particular vehicle. A visor/rod attachment assembly (100) is used to slidably attach a sun visor (78) to the rod (12). The assembly (100) allows the sun visor to be placed and maintained in an upward, stowed position or in a downward position. In the downward position, the sun visor (78) can be moved from one end to the other end of the sun visor rod (12) to optimally position the sun visor (78) to block the sun's rays from the eyes of a driver or a passenger.

12 Claims, 11 Drawing Sheets

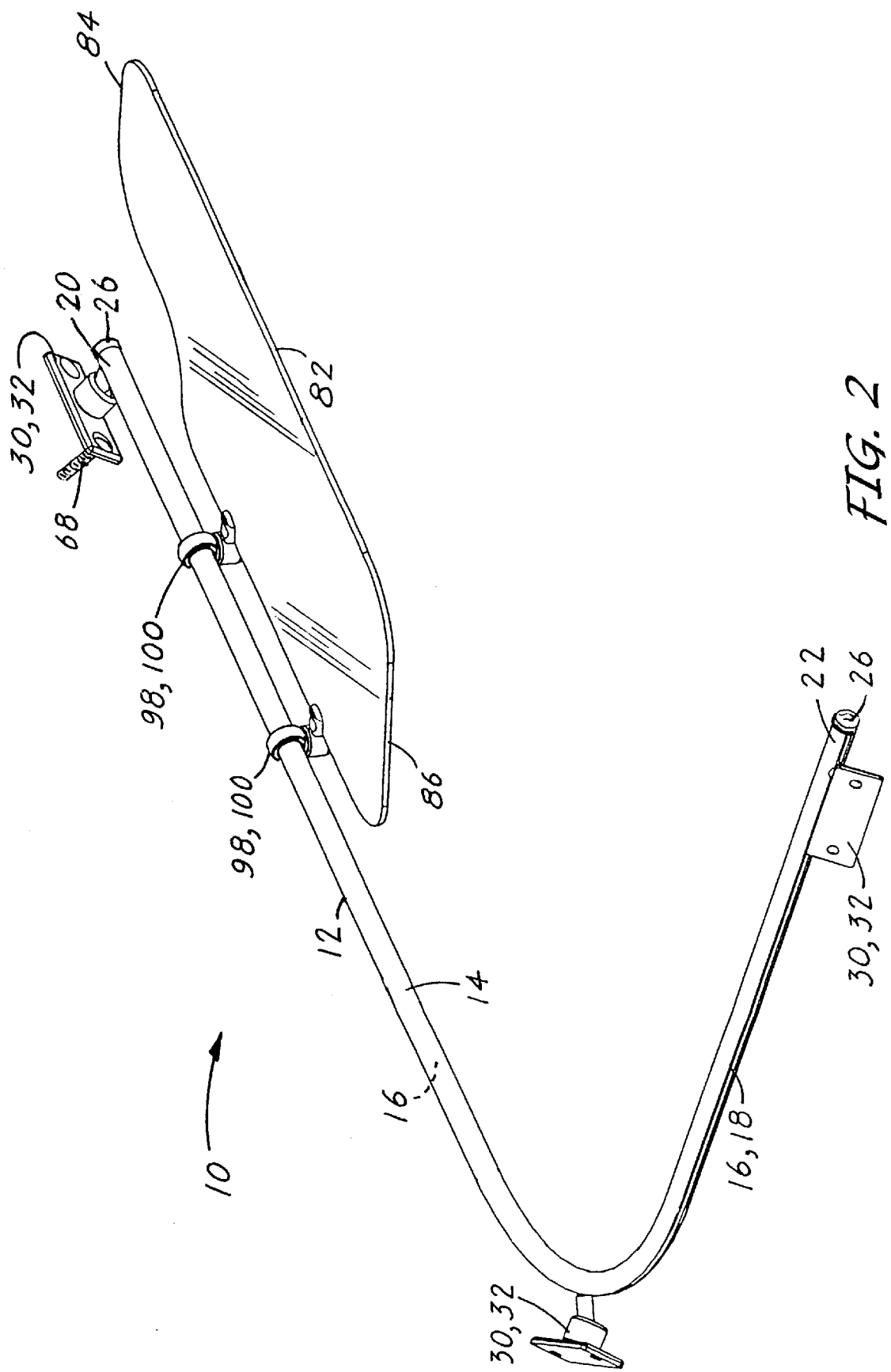

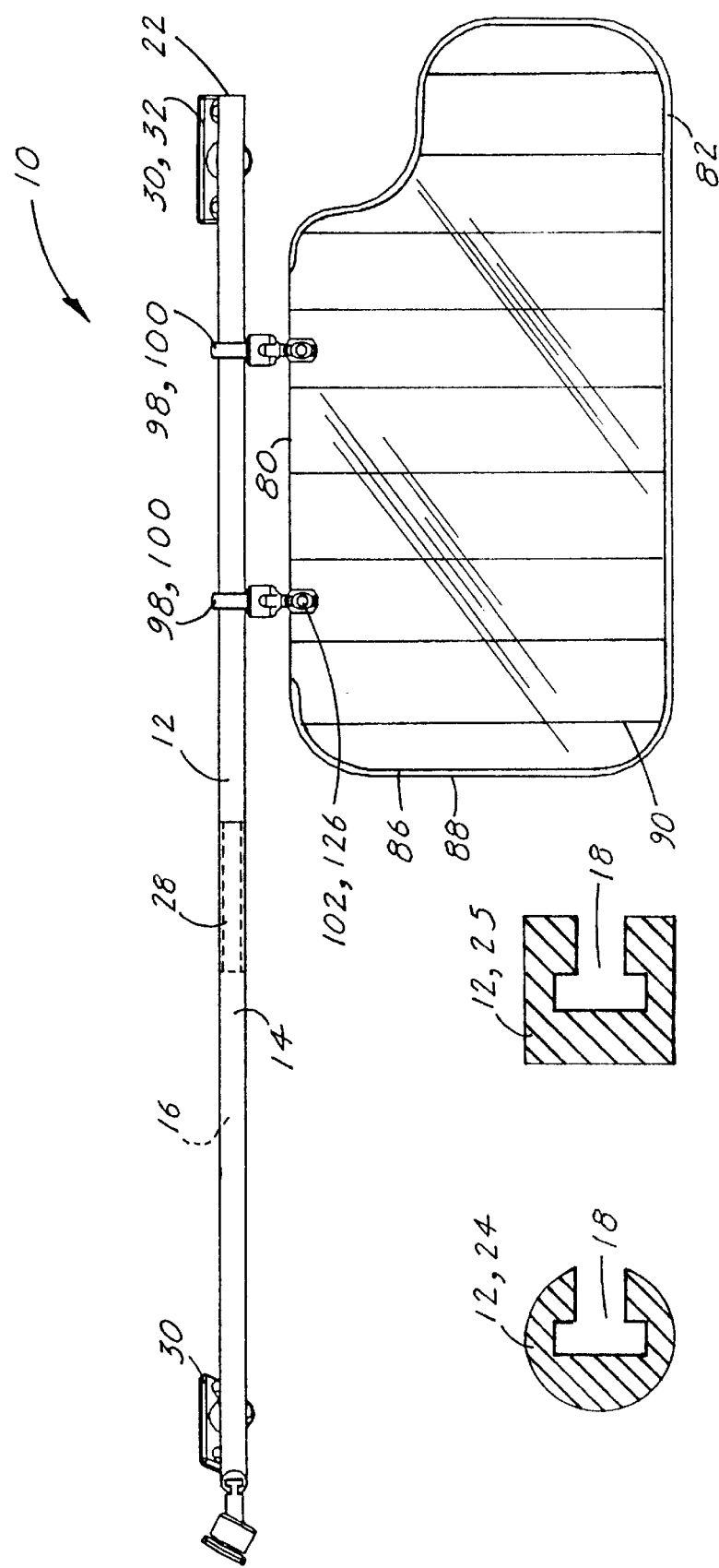

HORIZONTALLY AND VERTICALLY POSITIONABLE SUN VISOR

TECHNICAL FIELD

The invention pertains generally to vehicle sun visors and more particularly to a sun visor that can be continuously moved and placed in a horizontal and vertical position to shield the the eyes of a driver or passenger from the sun's rays.

BACKGROUND ART

Previously, many types of devices have been used to provide shading for a vehicle's driver and passengers from the sun or other reflective sources. Almost all automobiles and trucks available today utilize opaque sun visors, which are included as standard equipment. Prior art has attempted to extend the utility of some sun visors by improving the basic design with additions such as a transparent auxiliary glare shield or a screen located beneath or at the side of the existing standard visors. The reason for these additions is that while most visors perform adequately, it is advantageous for a vehicle to have a means by which a driver may alter the placement of a visor in order to reduce bright glare that originates from a location other than directly in front of the vehicle.

Attempts to achieve this utility have included visors with and without clip-on glare screens that pivot or slide downward beneath the visor or that swing down from a rotating joint that extends to the desired distance and are held in place by friction of the joint. Other devices position a screen inside the visor which can be pulled down, or add a side section that can slide horizontally from the visor. While these devices do solve part of the problem, they are limited in that they typically function adequately in only two positions—either in front of the person or to the side parallel with the door, depending on whether it is the driver or the passenger.

Obviously, it would be beneficial to provide a sun visor that could be moved and positioned as needed, depending on the locations from which the brightness or glare originates. For example, one of the most frequently occurring, as well as dangerous locations is at an angle of approximately 45° to the left side of a driver. With most current visors it is not possible to provide a sufficient block from this angle.

A search of the prior art did not disclose any patents that read directly on the claims of the instant invention, however the following U.S. patents are considered related:

| U.S. PAT. NO. | INVENTOR | ISSUED |
| --- | --- | --- |
| 4,323,275 | Lutz | April 6, 1982 |
| 4,792,176 | Karford | December 20, 1988 |
| 5,472,255 | Moore | December 5, 1995 |

The U.S. Pat. No. 4,323,275 patent discloses a housing attached to a visor with three auxiliary shields that may be withdrawn from slots in the visor.

The U.S. Pat. No. 4,792,176 patent discloses a visor extension unit that is releasably attachable to a conventional sun visor. The unit includes a lateral visor extension panel which is movable through a horizontal guide passage in the visor extension unit so as to effectively increase the windshield area blocked on either side of the sun visor. A glare shield is movable through a separate pocket formed in the extension unit.

The U.S. Pat. No. 5,472,255 patent discloses a sun visor which has a retractable sun screen. The screen is folded or rolled up into the visor for deployment beside the front window as well as the windshield.

For background purposes and as indicative of the art to which the invention relates reference may be made to the remaining cited patents.

| PATENT NO. | INVENTOR | ISSUED |
| --- | --- | --- |
| 5,580,117 | Goclowski | December 3, 1996 |
| 5,466,029 | Zetterlund | November 14, 1995 |
| 4,988,139 | Yamada | January 29, 1991 |
| 4,828,314 | Gavagan | May 9, 1989 |
| 4,679,842 | Hwang-Change | July 14, 1987 |
| 3,208,792 | Martin | September 28, 1965 |
| 2,134,414 | Norcross | October 25, 1938 |
| 1,806,059 | Hoople | May 19, 1931 |
| 1,573,272 | Phillips | February 16, 1926 |

DISCLOSURE OF THE INVENTION

The sun visor assembly is designed to be simply attached to a vehicle by an original equipment manufacturer or to be attached after it has been purchased. In its basic design, the invention consists of a left and right sun visor assembly each being a mirror image of the other. The sun visor is slidably attached to a sun visor rod that extends from a position above and near the center of the vehicle's windshield and curves to a position above the vehicle's side window. The sun visor is designed to be placed along the rod in an upward, stowed position or in a downward position. In the downward position the sun visor can be selectively moved to block the sun's rays from the eyes of a driver or a passenger.

The sun visor rod is attached to the vehicle by means of a rod/vehicle attachment assembly which consists of three elements: an inner section, a swivel section and a locknut.

The inner section includes an attachment plate that attaches to the vehicle by means of a pair of screws and an elongated section that terminates in a ball socket. The swivel section has an inner section that terminates in a ball that is dimensioned to rotate about the ball socket. The ball socket and ball are slidably secured to each other by the locknut which is tightened after the rod is optimally positioned in a horizontal and a vertical position.

The sun visor is attached to the sun visor rod by means of a pair of visor/rod attachment assemblies. Each assembly consists of three elements: a rod slider, a swivel clamp and a locknut.

The rod slider includes an upper rod engagement section and a lower section. The engagement section is dimensioned to slide along the visor rod and the lower section terminates in a ball socket. The swivel clamp has an upper ball section which is dimensioned to rotate about the ball socket and a lower section having a visor slat which has a bolt bore therethrough. The visor slat is dimensioned to receive an upper edge of the sun visor which also includes a pair of bolt bores. To secure the sun visor, a bolt and nut combination or a rivet is inserted through the respective bolt bores.

In view of the above disclosure, it is the primary object of the invention to produce a sun visor assembly that can be easily produced and attached to a vehicle, wherein the vehicle can consist of an automobile, a ship, a tractor or any type of vehicle that can benefit from a sun visor.

In addition to the primary object of the invention it is also an object of the invention to produce a sun visor assembly that:

can utilize a sun visor made of various materials ranging from a cushioned, non-transparent sun visor to a sun-blocking transparent material, can utilize a solid sun visor or a sun visor having a plurality of slats wherein the slats aid in moving the sun visor around a curved area of the sun visor rod, is maintenance free and is cost effective from both a manufacturer's and consumer's point of view.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 2 is a perspective view of the sun visor assembly shown in the driver's location in an upward stowed position. A sun visor rod is shown with a pair of end caps.

FIG. 3 is a cross-sectional view of the sun visor rod having a circular cross-section incorporating a T-groove.

FIG. 4 is a cross-sectional view of the sun visor rod having a square cross-section incorporating a T-groove.

FIG. 5 is a rear elevational view (driver's view) shown with the sun visor in a downward Position. The sun visor rod is shown with a telescoping section and the sun visor is also shown with a plurality of scored indentations and a perimeter bead.

BEST MODE FOR CARRYING OUT THE INVENTION

Figure 1:
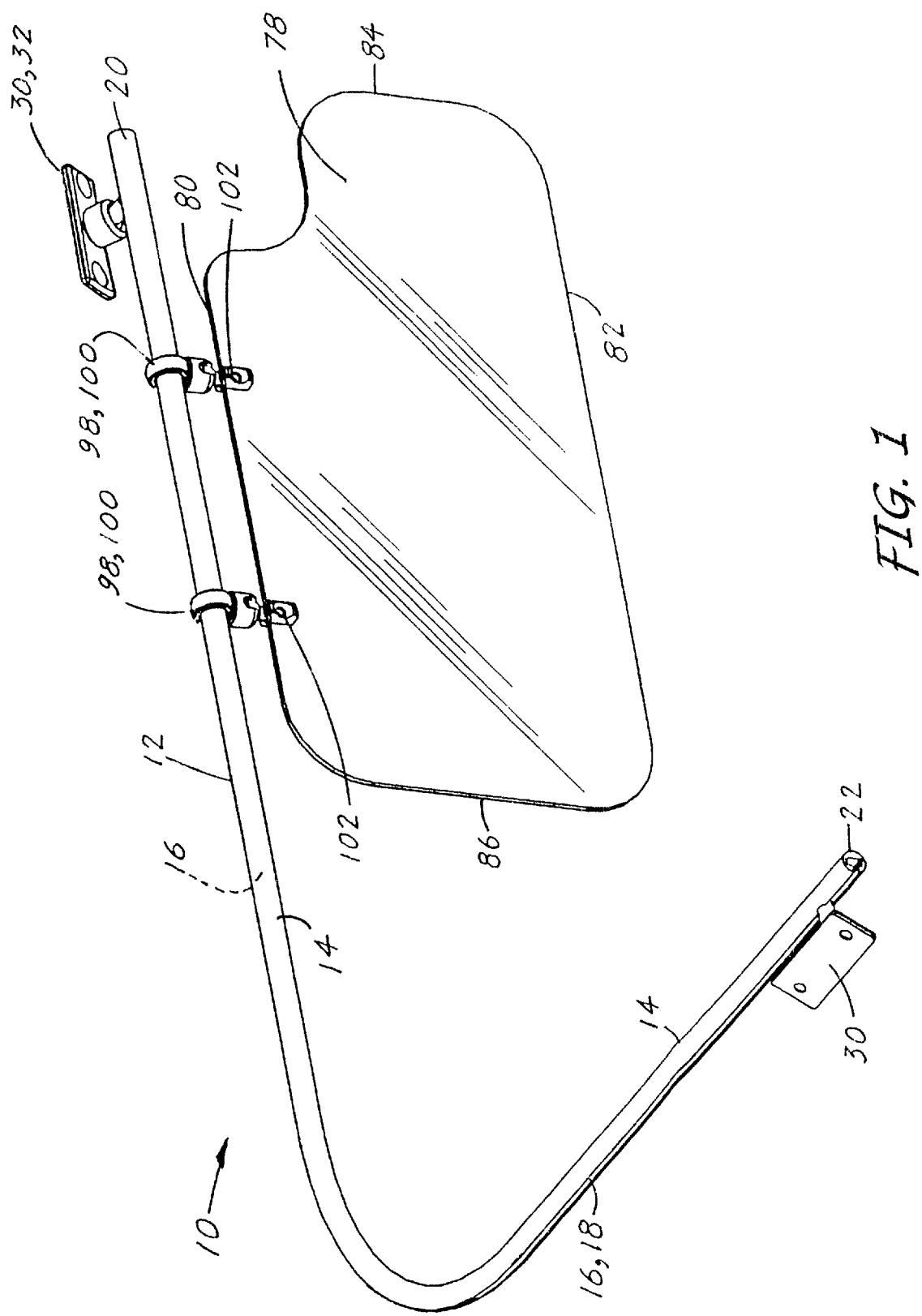
FIG. 1 is a perspective view of a sun visor assembly shown in the driver's location with the sun visor in a downward, sun blocking position.

The best mode for carrying out the invention is presented in terms of a preferred embodiment for a sun visor assembly which can be installed by an original equipment manufacturer (OEM) or installed in a vehicle after it has been purchased. The preferred embodiment of the vehicle sun visor assembly 10 as shown in FIGS. 1–17 is comprised of the following major elements: a sun visor rod 12, a rod/vehicle attachment assembly 32, a sun visor 78 and a visor/rod attachment assembly 100. Note that for brevity, only the driver's side of the sun visor assembly 10 is described since the assembly for the passenger side is a mirror image thereof.

The sun visor rod 12, as shown in FIGS. 1–11, includes an inner side 14, an outer side 16, a first end 20 and a second end 22. The first end 20 is located and attached, by a first rod/vehicle attachment means 30, to a vehicle headliner above the substantial center of a vehicle windshield. The rod 12 curves rearward, as shown in FIGS. 1 and 3, in a substantial horizontal plane and terminates with the second end 22 attached, by a second rod/vehicle attachment means 30, to the vehicle headliner above the substantial end of a vehicle side window. The vehicle side window can consist of a driver's or passenger's side windows or a rear side window.

The sun visor rod 12 can be constructed to have a circular cross section 24 as shown in FIGS. 1 and 3, or a square cross section 25 as shown in FIG. 4. In either configuration the sun visor rod 12 can be manufactured of metal such as steel or aluminum or of a high-impact plastic.

The visor sun rod 12, as shown in FIG. 2, can be designed to include an end cap 26 that is dimensioned to be frictionally inserted into or over the first end 20 and the second end 22 of the rod 12. Additionally, as shown in FIG. 5, the sun visor rod can be further comprised of at least one telescoping section 28 which allows the rod 12 to be extended to fit the dimensions of a particular vehicle.

The first and second rod/vehicle attachment means 30 are each preferably comprised of a rod/vehicle attachment assembly 32 as shown best in FIGS. 1, 2, 6, 11–13. To utilize the assembly 32 the sun visor rod 12 is designed to include a T-groove 18, as shown in FIGS. 3, 4, 6 and 17 which extends along the outer side 16 of the sun visor rod 12.

Figure 12:
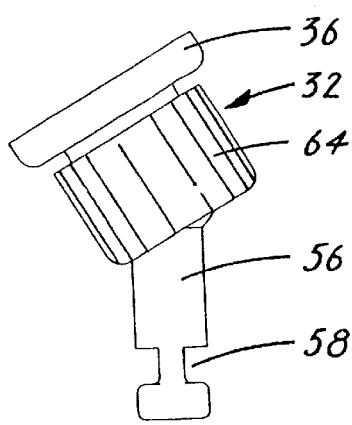
FIG. 12 is a side elevational view of the rod/vehicle attachment assembly.
Figure 13:
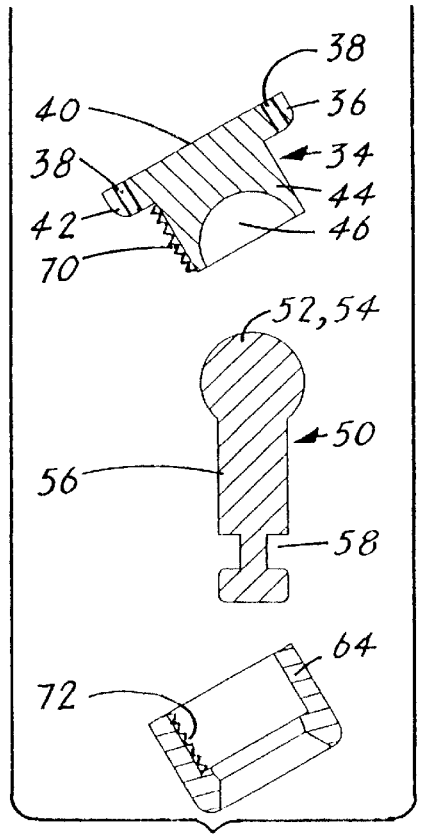
FIG. 13 is an exploded-sectional view of the rod/vehicle attachment assembly.
Figure 17:
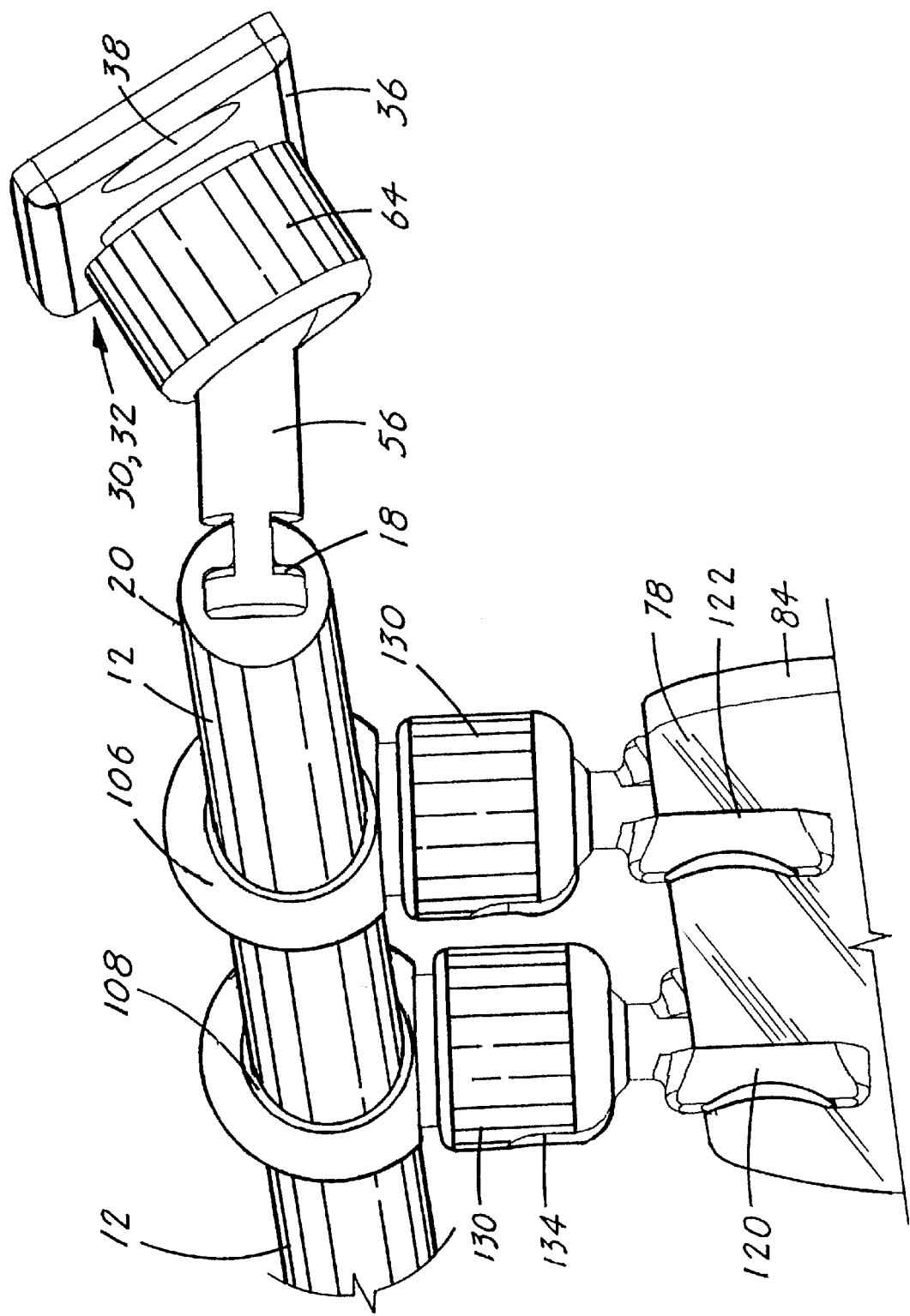
FIG. 17 is a perspective view of a sun visor rod showing an end to which is attached a rod/vehicle attachment assembly and also having inserted a pair of visor/rod attachment assemblies that are attached to a sun visor.

The rod/vehicle attachment assembly 32, as shown in a side elevational view in FIG. 12 and in an exploded view in FIG. 13 is comprised of three major elements: an inner section 34, a swivel section 50 and a locknut 64. All three elements are constructed of a metal such as steel or aluminum or they can be constructed of high-impact plastic.

The inner section 34 consists of an attachment plate 36 having a pair of bores 38, an inner surface 40 and an outer surface 42. From the outer surface 42 extends an elongated section 44 that terminates in a ball socket 46.

A swivel section 50 has an inner end 52 and an outer end 56. The inner end 52 terminates in a ball 54 that is dimensioned to rotate about the confines of the ball socket 46. The outer end 56 terminates in a T-section 58 that is dimensioned to slidably traverse the T-groove 18 on the sun visor rod 12.

The locknut 64 is dimensioned to fit over the elongated section 44 of the inner section 34 and has a means for securing the ball 54 within the ball socket 46. To utilize the rod/vehicle attachment assembly 32 the T-section 58 of a first rod/vehicle attachment assembly 32 is inserted into the T-groove 18 on the first end 20 of the sun visor rod 12, and the T-section 58 of a second assembly 32 is inserted into the T-groove 18 on the second end 22 of the rod 12. The attachment plates 36 of each respective assembly are then positioned and attached to the vehicle by means of screws 68. Once attached, the rod/vehicle attachment assembly 32 allows the sun visor rod 12 to be positioned in both a horizontal and vertical position to compensate for the particular dimensions of the vehicle in which the sun visor assembly is to be installed. After the proper position is selected, the locknut 64 is tightened to maintain the selected positions The means for securing the ball 54 within the ball socket 46 is accomplished by dimensioning the locknut 64 to frictionally fit over the elongated section 44 of the rod/vehicle attachment assembly 32 as shown on one side of FIG. 13. A second means for securing the ball within the ball socket can consist of the elongated section 44 of the rod/vehicle attachment assembly 32 having a set of outer threads 70 as shown on the opposite side of FIG. 13, and the locknut 64 having a set of corresponding inner threads 72 as also shown on the opposite side of FIG. 13.

Figure 10:
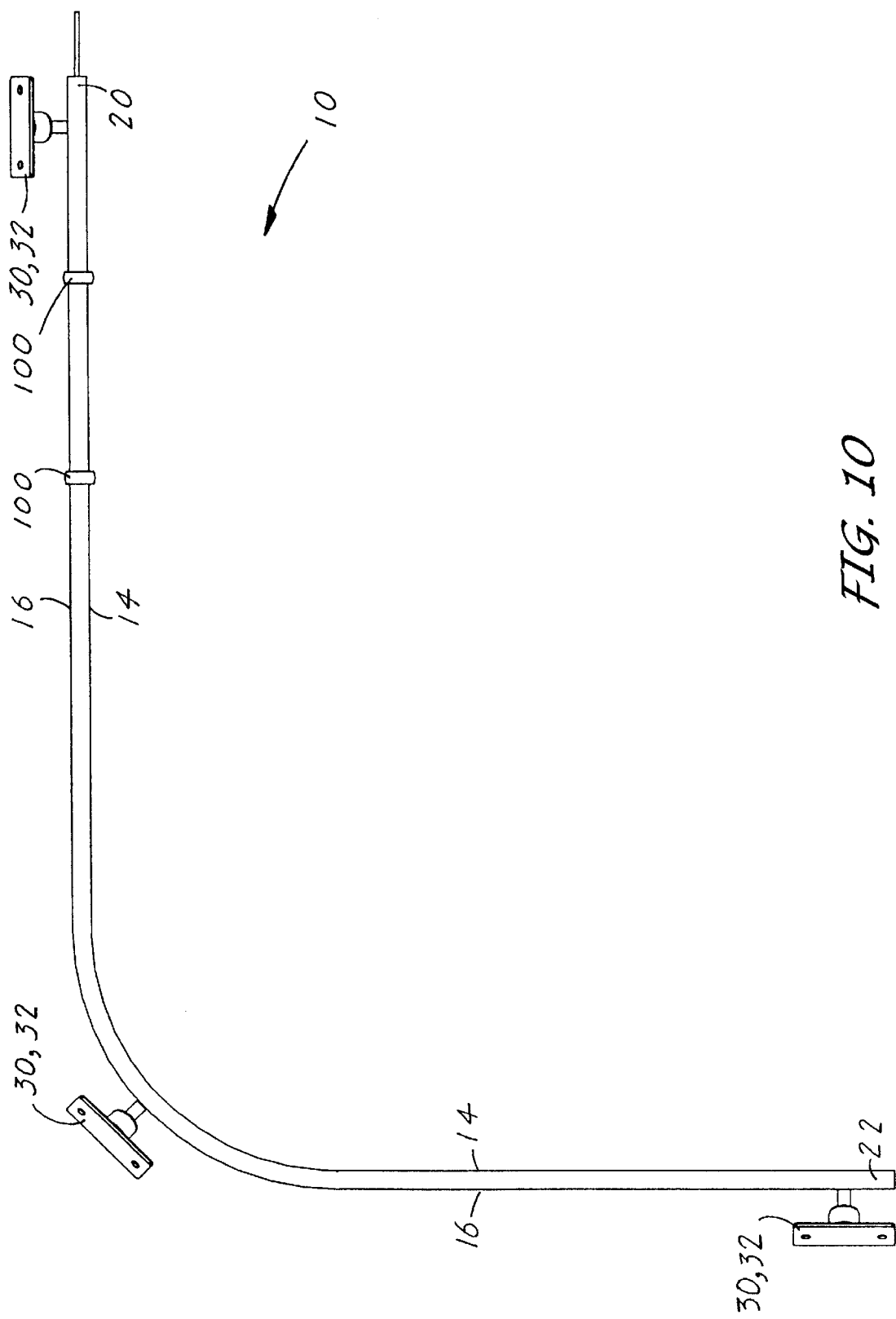
FIG. 10 is a top plan view of the sun visor assembly.
Figure 11:
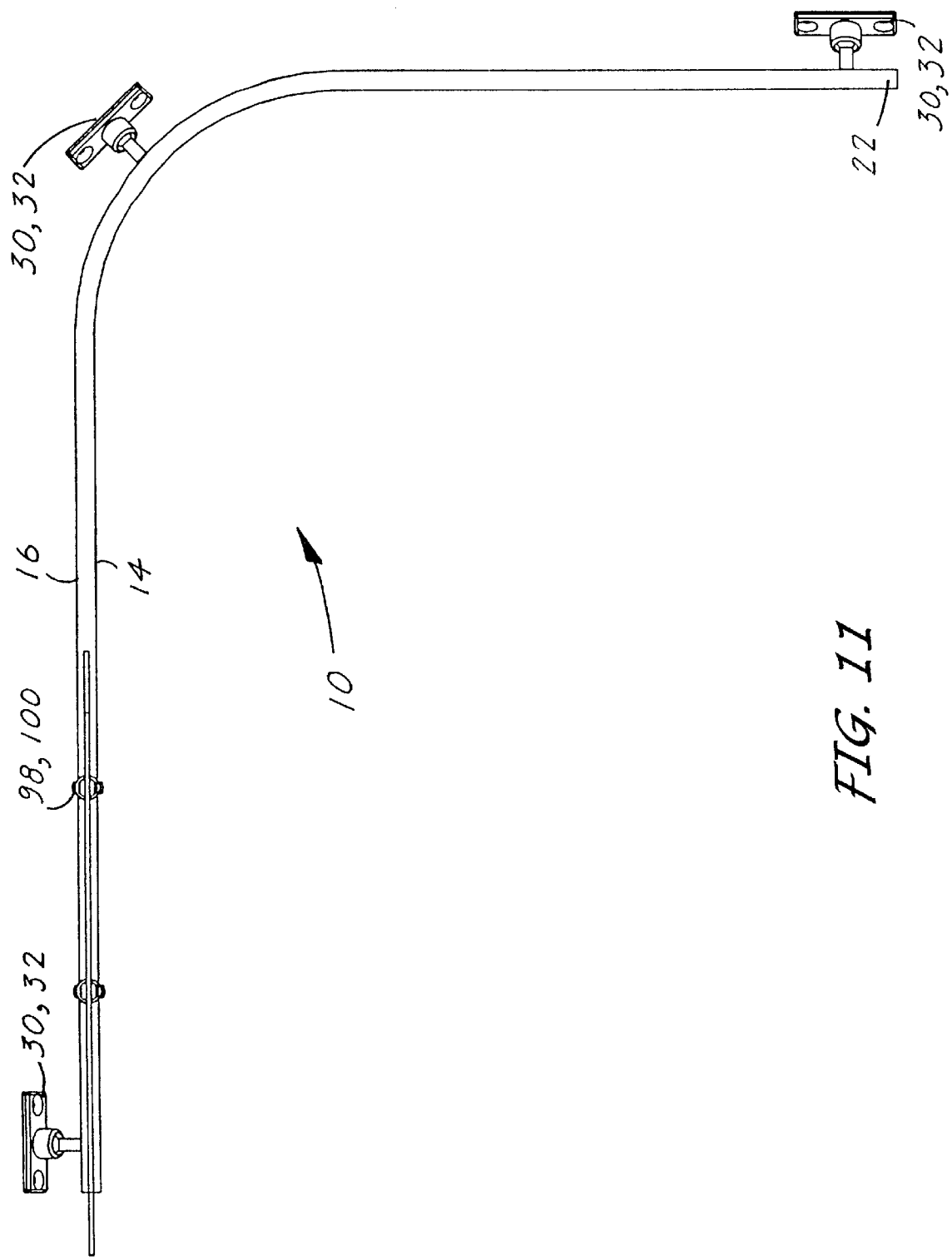
FIG. 11 is a bottom plan view of the sun visor assembly.

As shown in FIG. 1, a rod/vehicle attachment assembly is located near the first end 20 and the second end 22 of the sun visor rod 12. Alternatively, as shown in FIGS. 2, 10 and 11, a third rod/vehicle attachment assembly 32 can be substantially centered between the first end 20 and the second end 26 of the sun visor rod 12.

Figure 9:
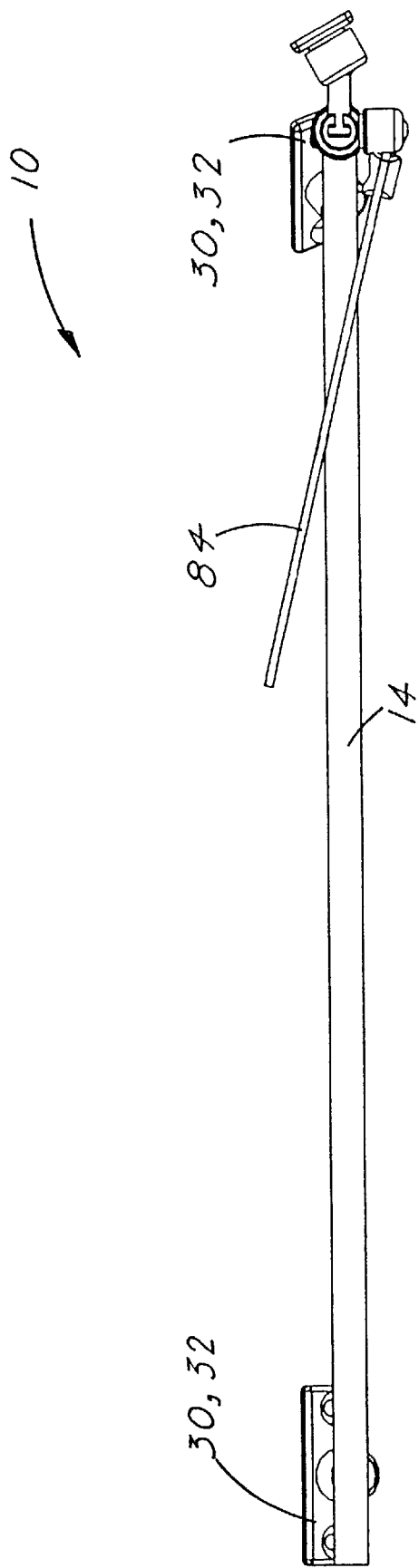
FIG. 9 is a left side elevational view shown with the sun visor in the upward stowed position.

The sun visor 78, as shown in FIGS. 1, 2, 5–9 and 11, includes an upper edge 80, a lower edge 82, an inner side 84 and an outer side 86. The upper edge 80 is slidably attached, by a visor/rod attachment means 98, to the sun visor rod 12. When attached, the visor 78 can be manually moved from an upward, stowed position, as shown in FIGS. 2 and 9 to a downward position. In the downward position, the sun visor 78 can be selectively moved from the first end 20 to the second end 22 of the sun visor rod 12 to block the sun's rays from the eyes of a driver or a passenger.

The sun visor 78 can be made of any resilient material that can traverse the curved section of the sun visor rod 12. This material can consist of rubber, formable plastic or preferably an optically clear thermoplastic tinted to reduce solar transmittance. The sun visor can also be made of horizontally polarized plastic that further aids in reducing glare. In all of the above materials, a round bead 88, as shown in FIG. 5 can be located around the perimeter edge of the sun visor 78.

Figure 6:
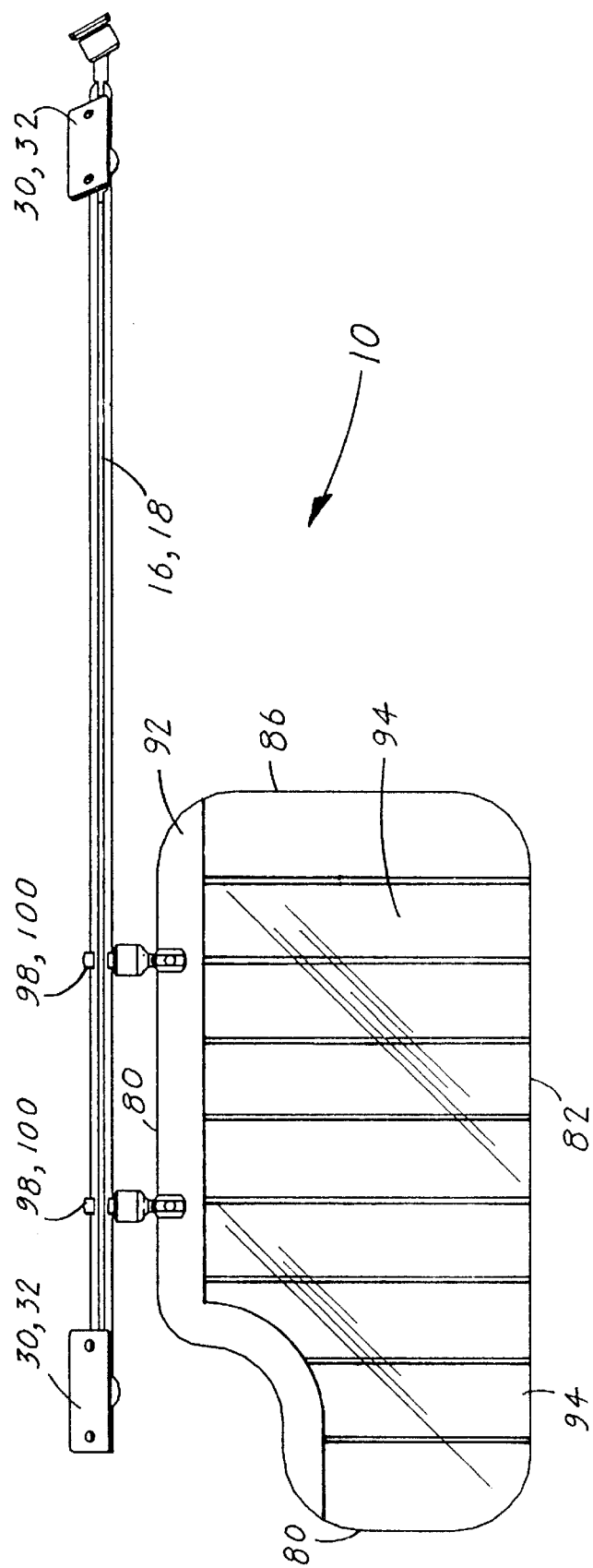
FIG. 6 is a front elevational view shown with the sun visor in a downward position. The sun visor is also shown with a plurality of vertical slats.
Figure 7:
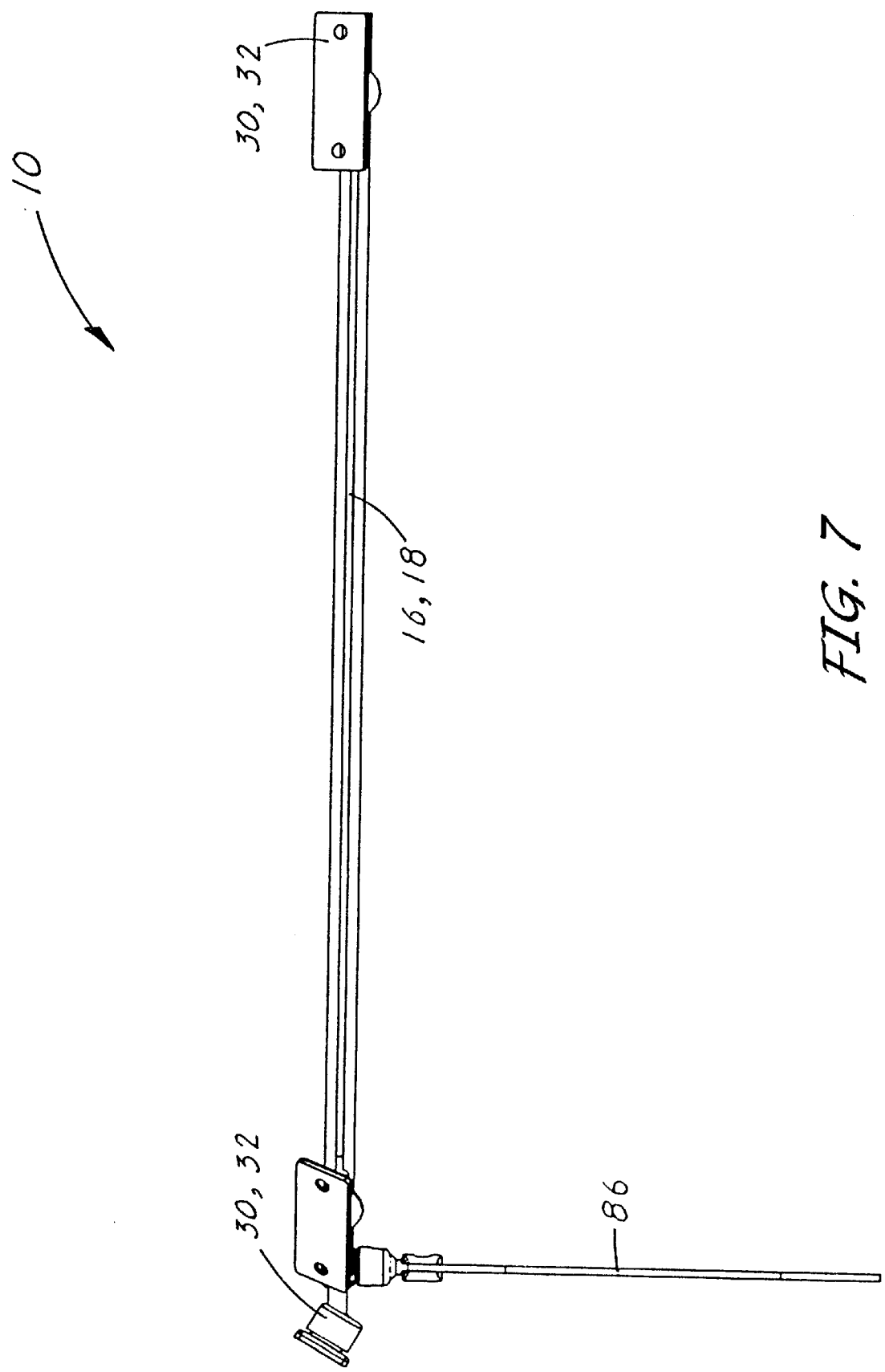
FIG. 7 is a right side elevational view shown with the sun visor in the downward position.
Figure 8:
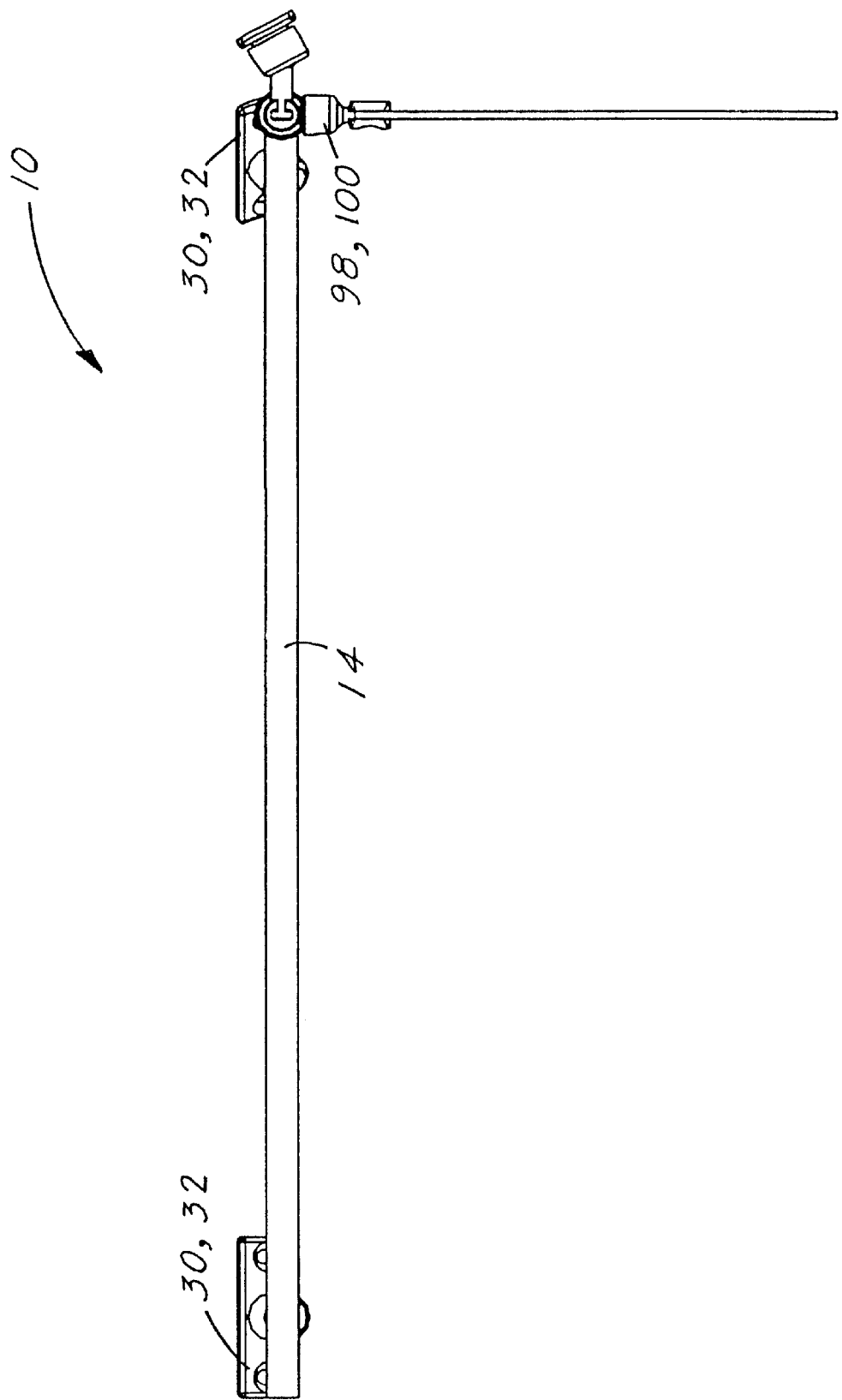
FIG. 8 is a left side elevational view shown with the sun visor in the downward position.

The sun visor 78 can also be designed to include a plurality of vertically scored indentations 90 as shown in FIG. 5. These indentations facilitate the movement of the sun visor 78 when the visor traverses the curved section of the sun visor rod. Also, as shown in FIG. 6, the sun visor can be constructed with an upper attachment strip 92 from which extend downward a plurality of slats 94. The slats facilitate the movement of the sun visor 78 when the visor traverses the curved section of the sun visor rod.

The visor/rod attachment means 98 is preferably comprised of a visor/rod attachment assembly 100 as shown best in FIGS. 1, 2, 5, 6, 8, 14 and 15. To utilize the assembly 100 the sun visor 78 includes a pair of bolt bores 102 which are located adjacent the upper edge 80 of the sun visor 78 as shown in FIGS. 1 and 5.

Figure 15:
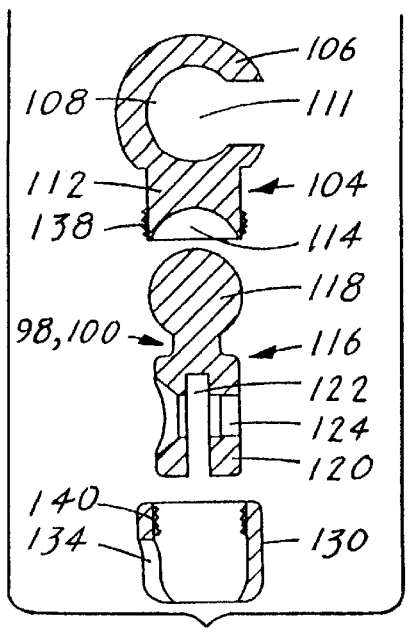
FIG. 15 is an exploded-sectional view of the visor/rod attachment assembly which includes the circular section having a side opening.
Figure 14:
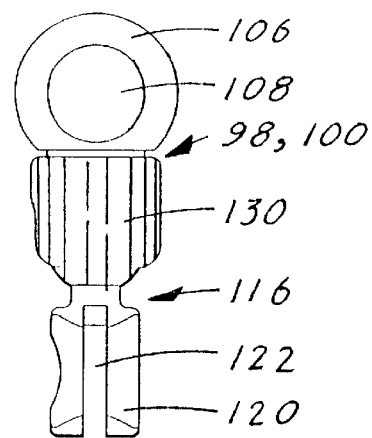
FIG. 14 is a side elevational view of the visor/rod attachment assembly that includes a rod slider having an upper section which includes a circular section having a central opening.

The visor/rod attachment assembly 100, as shown in a side elevational view in FIG. 14 and in an exploded view in FIG. 15 is comprised of three major elements: a rod slider 104, a swivel clamp 116 and a locknut 130. All three elements can be constructed of a metal or of high-impact plastic.

The rod slider 104 includes an upper rod engagement section 106 and a lower section 112. The section 106 is dimensioned to allow the rod slider 104 to slide along the sun visor rod 12 and the lower section 112 to terminate in a ball socket 114.

Figure 16:
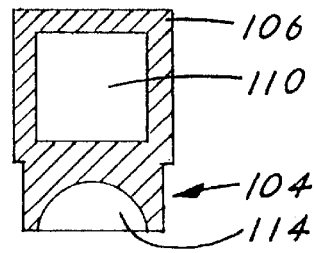
FIG. 16 is a side sectional view of a rod slider having an upper rod engagement section having a square bore which is dimensioned to slidably fit into a square sun visor rod.

The upper rod engagement section 106 can be designed to have a circular bore 108, as shown in FIG. 14 that is dimensioned to be slidably inserted into a sun visor rod having a circular cross-section as shown in FIG. 3. Alternatively, the upper rod engagement section 106 can be designed to include a square bore 110, as shown in FIG. 16, that is dimensioned to be slidably inserted into the sun visor rod 11 having a square cross-section as shown in FIG. 4. Additionally, the upper rod engagement section 106 that has a circular section can include a side opening 111, as shown in FIG. 15, which allows the circular section to be inserted into the side and slid along the sun visor rod 12.

The swivel clamp 116 is designed to include an upper ball section 118, a lower section 120, and a locknut 130. The upper ball section is dimensioned to slidably rotate about the confines of the ball socket 114. The lower section 120 has a visor slot 12e having therethrough a bolt bore 124. The slot 122 is dimensioned to receive the upper edge 80 of the sun visor 78. When a bolt 126 is inserted through the respective bolt bores 102, 124 located on the sun visor 78 and the slot 122 respectively, the visor 78 is secured to the swivel clamp 116.

The locknut 130 is dimensioned to fit over the lower section 120 of the swivel clamps 116 and has means for securing the upper ball section 118 within the ball socket 114. The locknut includes a vertical slot 134 located and dimensioned to receive the lower section 120 of the swivel clamp 116 which allows the sun visor 78 to be frictionally placed in the upward, stowed position as shown in FIGS. 2 and 9.

The means for securing the upper ball section 118 within the ball socket 114 is accomplished by the lower section 112 of the rod slider 104 having a set of outer threads 138, and the locknut 130 having a set of corresponding inner threads 140 as shown in FIG. 15.

While the invention has been described in complete detail and pictorially shown in the accompanying drawings it is not to be limited to such details, since many changes and modifications may be made to the invention without departing from the spirit and the scope thereof. Hence, it is described to cover any and all modifications and forms which may come within the language and scope of the claims.

What is claimed is:

1. A vehicle sun visor assembly comprising:
 a) a sun visor rod having an inward side, an outward side, a first end and a second end, wherein the first end is located and attached, by a rod/vehicle attachment means, to a vehicle headliner above the substantial center of a windshield, wherein said attachment means comprises:
  (1) said sun visor rod having a T-groove that extends along the outward side of said rod,
  (2) a rod/vehicle attachment assembly comprising:
   (a) an inner section consisting of an attachment plate having a pair of bores, an inner surface and an outer surface, wherein from the outer surface extends an elongated section that terminates in a ball socket,
   (b) a swivel section having an inner end that terminates in a ball that is dimensioned to rotate about the confines of the ball socket, and an outer end that terminates in a T-section dimensioned to slidably traverse the T-groove on said sun visor rod, and
   (c) a locknut dimensioned to fit over the elongated section and having means for securing the ball within the ball socket, wherein to utilize the rod/vehicle attachment assembly the T-section of a first assembly is inserted into the T-groove on the first end of said sun visor rod and the T-section of a second assembly is inserted into the T-groove on the second end of said rod, the attachment plates of each respective assembly are then positioned and attached to the vehicle by means of screws, once attached, the rod/vehicle attachment assembly allows said sun visor rod to be positioned in both a horizontal and vertical position to compensate for the particular dimensions of the vehicle in which said sun visor assembly is to be installed, after the proper position is selected, the locknut is tightened to maintain the selected position, wherein said rod curves rearward in a substantial horizontal plane and terminates with the second end attached, by a second rod/vehicle attachment means, to the vehicle headliner above the substantial end of a vehicle side window, and b) a sun visor having an upper edge, a lower edge, an inner side and an outer side, wherein the upper edge is slidably attached, by a visor/rod attachment means, to said sun visor rod, wherein said visor can be manually moved from an upward, stowed position to a downward position, wherein in the downward position, the visor can be selectively moved from the first end to the second end of said rod to block the sun's rays from the eyes of a driver or a passenger.

2. The assembly as specified in claim 1 wherein said rod/vehicle attachment assembly is constructed of a metal or high-impact plastic.

3. The assembly as specified in claim 1 further comprising an end cap that is dimensioned to be frictionally inserted over the first end and the second end of said sun visor rod.

4. The assembly as specified in claim 1 wherein said means for securing the ball within the ball socket is accomplished by dimensioning said locknut to frictionally fit over the elongated section of said rod/vehicle attachment assembly.

5. The assembly as specified in claim 1 wherein said means for securing the ball within the ball socket comprises:
   a) said elongated section of said rod/Vehicle attachment assembly having a set of outer threads, and
   b) said locknut having a set of corresponding inner threads.

6. The assembly as specified in claim 1 wherein said sun visor rod has a circular cross section.

7. The assembly as specified in claim 1 wherein said sun visor rod is constructed of metal or high-impact plastic.

8. A vehicle sun visor assembly comprising:
   a) a sun visor rod having an inward side, an outward side, a first end and a second end, wherein the first end is located and attached, by a rod/vehicle attachment means, to a vehicle headliner above the substantial center of a windshield, wherein said attachment means comprises:
      (1) said sun visor having a pair of bolt bores located adjacent the upper edge of said visor,
      (2) a rod slider having:
         (1) an upper rod engagement section dimensioned to allow said rod slider to slide along said sun visor rod, and
         (2) a lower section which terminates in a ball socket,
      (3) a swivel clamp having:
         (a) an upper ball section that is dimensioned to slidably rotate about the confines of the ball socket, and
         (b) a lower section having a visor slot having therethrough a bolt bore, wherein the slot is dimensioned to receive the upper edge of said visor, wherein when a bolt is inserted through the respective bolt bores on said sun visor and said slot respectively, said visor is secured to the swivel clamp, and
      (4) a locknut dimensioned to fit over the lower section of said swivel clamp and having means for securing the ball within the ball socket, wherein said locknut having a vertical slot located and dimensioned to receive the lower section of said swivel clamp to allow the sun visor to be frictionally placed in the upward, stowed position, wherein said rod curves rearward in a substantial horizontal plane and terminates with the second end attached, by a second rod/vehicle attachment means, to the vehicle headliner above the substantial end of a vehicle side window, and b) a sun visor having an upper edge, a lower edge, an inner side and an outer side, wherein the upper edge is slidably attached, by a visor/rod attachment means, to said sun visor rod, wherein said visor can be manually moved from an upward, stowed position to a downward position, wherein in the downward position, the visor can be selectively moved from the first end to the second end of said rod to block the sun's rays from the eyes of a driver or a passenger.

9. The assembly as specified in claim 8 wherein the upper rod engagement section having a circular bore dimensioned to be slidably inserted into said sun visor rod having a circular cross-section.

10. The assembly as specified in claim 8 wherein the upper rod engagement section having a square bore dimensioned to be slidably inserted into said sun visor rod having a square cross-section.

11. The assembly as specified in claim 8 wherein the upper rod engagement section is comprised of a circular section having a side opening which allows the circular section to be inserted into the side and slid along said sun visor rod.

12. The assembly as specified in claim 8 wherein said means for securing the ball within the ball socket comprises:
   a) said lower section of said rod slider having a set of outer threads, and
   b) said locknut having a set of corresponding inner threads.

* * * * *